United States Patent
Titcomb et al.

(10) Patent No.: US 7,038,660 B2
(45) Date of Patent: May 2, 2006

(54) WHEEL MOTION CONTROL INPUT DEVICE FOR ANIMATION SYSTEM

(75) Inventors: Andrew Eric Titcomb, Valencia, CA (US); Peter M. Nofz, Santa Monica, CA (US); Bruce Eugene Dobrin, Santa Barbara, CA (US); Ronald Albert Fischer, Hollywood, CA (US); Jerome Chen, Redondo Beach, CA (US)

(73) Assignees: Sony Corporation, (JP); Sony Pictures Entertainment, Inc., Culver City, CA (US)

( * ) Notice: Subject to any disclaimer, the term of this patent is extended or adjusted under 35 U.S.C. 154(b) by 139 days.

(21) Appl. No.: 10/443,506

(22) Filed: May 22, 2003

(65) Prior Publication Data

US 2004/0178988 A1    Sep. 16, 2004

Related U.S. Application Data

(60) Provisional application No. 60/454,989, filed on Mar. 13, 2003.

(51) Int. Cl.
*G09G 5/08*    (2006.01)

(52) U.S. Cl. ...................... 345/156; 345/184

(58) Field of Classification Search ................ 345/156, 345/161, 163, 164, 165, 168, 169, 418, 419, 345/619, 653, 661, 679, 706, 710, 167, 184, 345/473, 435, 158, 166, 755, 756, 757; 463/31, 463/36; 703/7
See application file for complete search history.

(56) References Cited

U.S. PATENT DOCUMENTS 5,497,188 A  *  3/1996  Kaye ........................... 348/36

(Continued)

*Primary Examiner*—Vijay Shankar
*Assistant Examiner*—Nitin Patel
(74) *Attorney, Agent, or Firm*—O'Melveny & Myers LLP

(57) ABSTRACT

An input device for a computer graphics system provides a plurality of wheels that control movement of a virtual camera. The input device can be readily used by professional cameraman without knowledge or training on CG animation software tools. The input device comprises a housing having at least one wheel operatively coupled to at least one outer surface of the housing. The at least one wheel has an axially coupled shaft that is driven rotationally by manipulation of the wheel. Circuitry contained within the housing and operatively coupled to the shaft generates a control signal corresponding to rotational motion of the at least one wheel. The control signal is thereby provided to the animation processor to control the virtual camera. In a preferred embodiment of the invention, the at least one wheel further comprises a plurality of wheels with each such wheel corresponding to a different range of motion of the virtual camera, including a first wheel corresponding to panning motion of the virtual camera, a second wheel corresponding to tilting motion of the virtual camera, and a third wheel corresponding to rolling motion of the virtual camera. The circuitry further includes an angle encoder operatively coupled to the shaft and a control circuit adapted to convert the control signal into a data stream having a format readable by the animation processor. The input device may also include at least one speed control adapted to change effective resolution of the at least one wheel, and at least one direction control adapted to change effective direction of the at least one wheel.

18 Claims, 3 Drawing Sheets

U.S. PATENT DOCUMENTS

| | | | |
|---|---|---|---|
| 5,893,296 A * | 4/1999 | Rosheim | 74/490.03 |
| 6,040,841 A * | 3/2000 | Cohen et al. | 345/473 |
| 6,154,723 A * | 11/2000 | Cox et al. | 704/270 |
| 6,161,933 A * | 12/2000 | Tschida et al. | 352/179 |
| 6,206,783 B1 * | 3/2001 | Yamamoto et al. | 463/36 |
| 6,256,048 B1 * | 7/2001 | Foster et al. | 345/474 |
| 6,325,717 B1 * | 12/2001 | Kawagoe et al. | 463/33 |
| 6,670,957 B1 * | 12/2003 | Fukuda | 345/473 |
| 6,746,331 B1 * | 6/2004 | Saikawa et al. | 463/31 |
| 2001/0016804 A1 * | 8/2001 | Cunningham et al. | 703/7 |

* cited by examiner

WHEEL MOTION CONTROL INPUT DEVICE FOR ANIMATION SYSTEM

CROSS-REFERENCE TO RELATED APPLICATION

This application claims priority pursuant to 35 U.S.C. § 119(e) to U.S. provisional patent application Ser. No. 60/454,989, filed Mar. 13, 2003, entitled "Wheel Camera System."

BACKGROUND OF THE INVENTION

1. Field of the Invention

The present invention relates to three-dimensional graphics and animation, and more particularly, to an input device for manipulating a virtual camera in a computer graphics animation system in a manner that mimics the control of an actual camera.

2. Description of Related Art

Computer graphics (CG) animation is often used in the production of motion pictures and video games to create digital representations of a character in a scene. In a typical CG animation system, computer software tools are used to create and render virtual objects. The objects may be modified to produce a series of individual frames that are successively displayed in the form of a movie or video file, thereby giving the object the appearance of motion. A technique used to generate source data for CG animation is known as motion capture, in which the movement of a real object is mapped onto a computer generated object. In a motion capture system, an actor wears a suit having markers attached at various locations (e.g., small reflective markers attached to the body and limbs) and digital cameras record the movement of the actor from different angles while illuminating the markers. The system then analyzes the images to determine the locations (e.g., as spatial coordinates) and orientation of the markers on the actor's suit in each frame. By tracking the locations of the markers, the system creates a spatial representation of the markers over time and builds a digital representation of the actor in motion. The motion is then applied to a digital representation, which may then be textured and rendered to produce a complete CG representation of the actor and/or performance. This technique has been used by special effects companies to produce incredibly realistic animations in many popular movies.

An advantage of using a motion capture system in CG animation is that the source data represents a three-dimensional view of the captured motion. In other words, the captured motion data can be viewed from almost any perspective. Conventional CG animation software tools enable an animation producer to set virtual cameras to view the source data from desired angles, such as a perspective view, a top view a front view, etc. Moreover, the virtual cameras may be moved using software tools to follow action within a virtual scene. One technique used to move the virtual camera is to set keyframes defining transition points for changes in the camera motion. For example, one keyframe may define a first point at which the virtual camera will begin to pan (i.e., lateral motion) to follow the action, and a second keyframe may define a second point at with the virtual camera will stop panning. The software tools will then automatically move the virtual camera during the time between the two keyframes to produce a view of the source data reflecting the desired camera motion. The keyframing technique is advantageous in that it significantly reduces the time needed to produce a CG animation.

A drawback of the keyframing technique is that the movement of the virtual camera generally appears very mechanical and lacks the human touch that characterizes physical camera movements used in conventional live action film production. In a live action production, the camera is moved to follow the action at a rate that may vary widely to suit the scene. For example, the camera may pan to follow movement, then hesitate slightly at one point to emphasize an object in the scene, and then continue with the movement. Moreover, the camera movement may comprise a complex combination of pan, tilt, roll and focus motions. While these types of actions can be controlled using conventional software tools by setting a greater number of key frames, this lacks the spontaneity and artistic composition that is achieved with physical camera movement.

A related drawback of the keyframing technique is that the software tools require a reasonably high level of skill and knowledge in order to perform a complex virtual camera movement. For this reason, keyframing is generally performed using an experienced CG animation software operator, even though these software operators often lack the experience and artistic skill of professional cameramen or cinematographers. At the same time, professional cameramen that are very experienced in controlling a camera often have no training in the use of CG animation software tools. The movement of professional movie cameras is generally performed using a mechanical interface, such as rotary hand actuator or wheel, that is manipulated while observing the action. Professional cameramen develop an artistic skill in controlling the motion of the camera that cannot be easily translated to the control of software tools utilizing keystroke and mouse click commands. While it is possible to have a collaboration between software operators and cameramen to bring both sets of skills to the task, such efforts are unduly cumbersome and ultimately increase the production cost.

Accordingly, it would be desirable to provide an interface for a computer graphics animation system that overcomes these and other drawbacks of the prior art. More specifically, it would be desirable to provide an input device for manipulating a virtual camera in a computer graphics animation system in a manner that mimics the control of an actual camera.

SUMMARY OF THE INVENTION

In accordance with the teachings of the present invention, an input device for a computer graphics system provides a plurality of wheels that control movement of a virtual camera. The input device can be readily used by professional cameraman without knowledge or training on CG animation software tools.

More particularly, the input device comprises a housing having at least one wheel operatively coupled to at least one outer surface of the housing. The at least one wheel has an axially coupled shaft that is driven rotationally by manipulation of the wheel. Circuitry contained within the housing and operatively coupled to the shaft generates a control signal corresponding to rotational motion of the at least one wheel. The control signal is thereby provided to the animation processor to control the virtual camera. In a preferred embodiment of the invention, the at least one wheel further comprises a plurality of wheels with each such wheel corresponding to a different range of motion of the virtual camera, including a first wheel corresponding to panning motion of the virtual camera, a second wheel corresponding to tilting motion of the virtual camera, and a third wheel corresponding to rolling motion of the virtual camera. The circuitry further includes an angle encoder operatively coupled to the shaft and a control circuit adapted to convert the control signal into a data stream having a format readable by the animation processor. The input device may also include at least one speed control adapted to change effective resolution of the at least one wheel, and at least one direction control adapted to change effective direction of the at least one wheel.

In another embodiment of the invention, a computer graphics animation system comprises an animation processor adapted to execute a software program enabling the creation of 3D graphical images including a virtual camera that is controllable to determine orientation of viewing of the 3D graphical images, and an input device operatively coupled to the animation processor for controlling a range of motion of the virtual camera. The input device comprises a housing and at least one wheel operatively coupled to at least one outer surface of the housing. Each wheel has an axially coupled shaft that is driven rotationally by manipulation of the wheel. Circuitry contained within the housing and operatively coupled to the shaft generates a control signal corresponding to rotational motion of each wheel. The control signal is thereby provided to the animation processor to control the virtual camera.

A more complete understanding of the input device for a computer graphics animation system will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

As will be further described below, the present invention satisfies the need for a input device for manipulating a virtual camera in a computer graphics animation system in a manner that mimics the control of an actual camera. In the detailed description that follows, like element numerals are used to describe like elements illustrated in one or more of the drawings.

Figure 1:
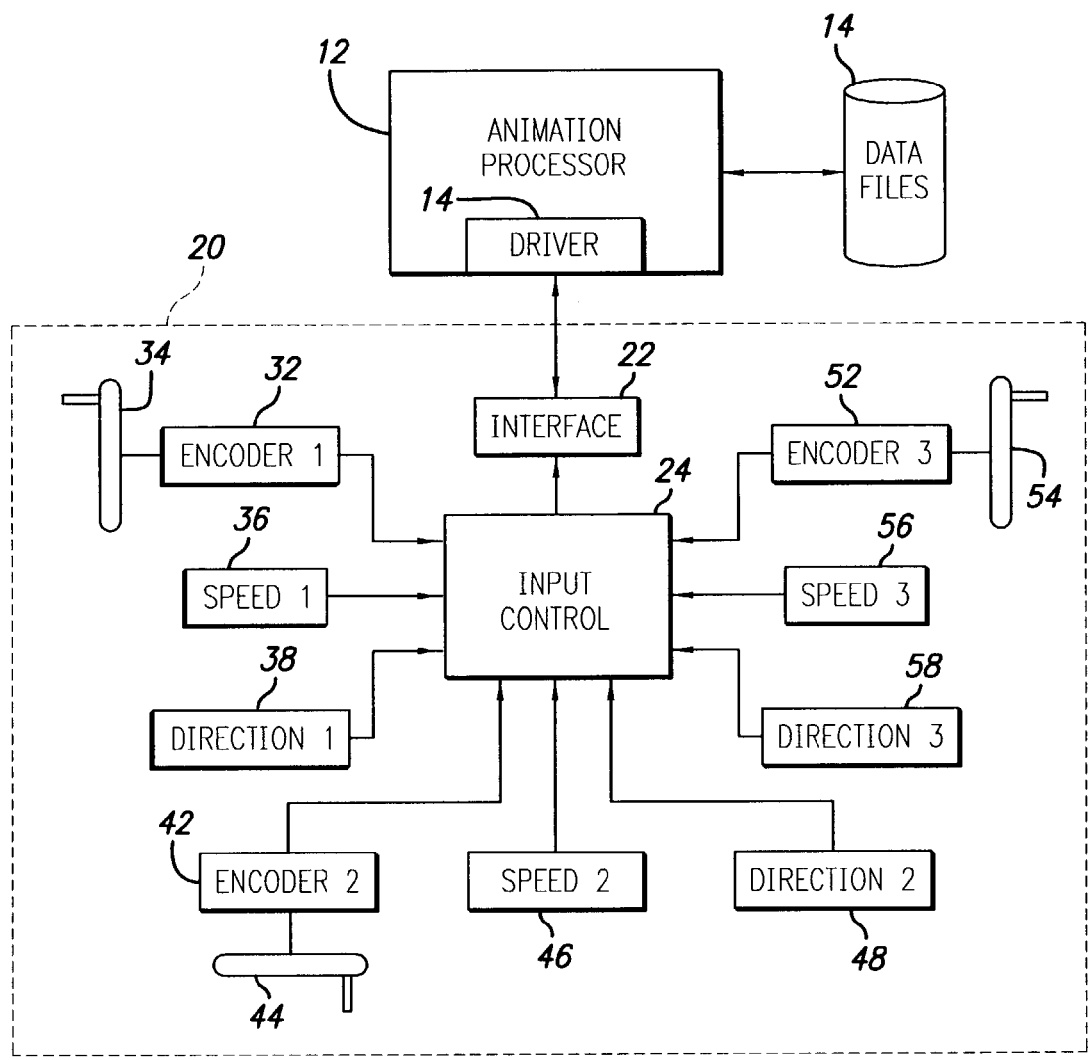
FIG. 1 is a block diagram illustrating a computer graphics animation systems having an input device in accordance with an embodiment of the present invention.

Referring first to FIG. 1, a block diagram illustrates an exemplary animation system in accordance with an embodiment of the present invention. The animation system includes an animation processor 12 that enables a graphic artist to create a computer graphics animation. The animation processor 12 may further comprise a programmable computer executing a commercial software package that enables the creation of 3D graphics and animation for the entertainment industry, such as the FiLMBOX® software product line sold by Kaydara, Inc., the Maya® software product line sold by Alias|Wavefront™ or other like products. The animation processor 12 accesses a plurality of data files 14 stored in a persistent or non-volatile memory, as is commonly understood in the art. The data files may include source data representing a three-dimensional (3D) view of the motion captured using a motion capture system or generated using other computer graphics techniques known in the art. The animation processor includes conventional tools that enable the source data to be edited and manipulated, including the ability to display the captured data from the perspective of a virtual camera.

Figure 4:
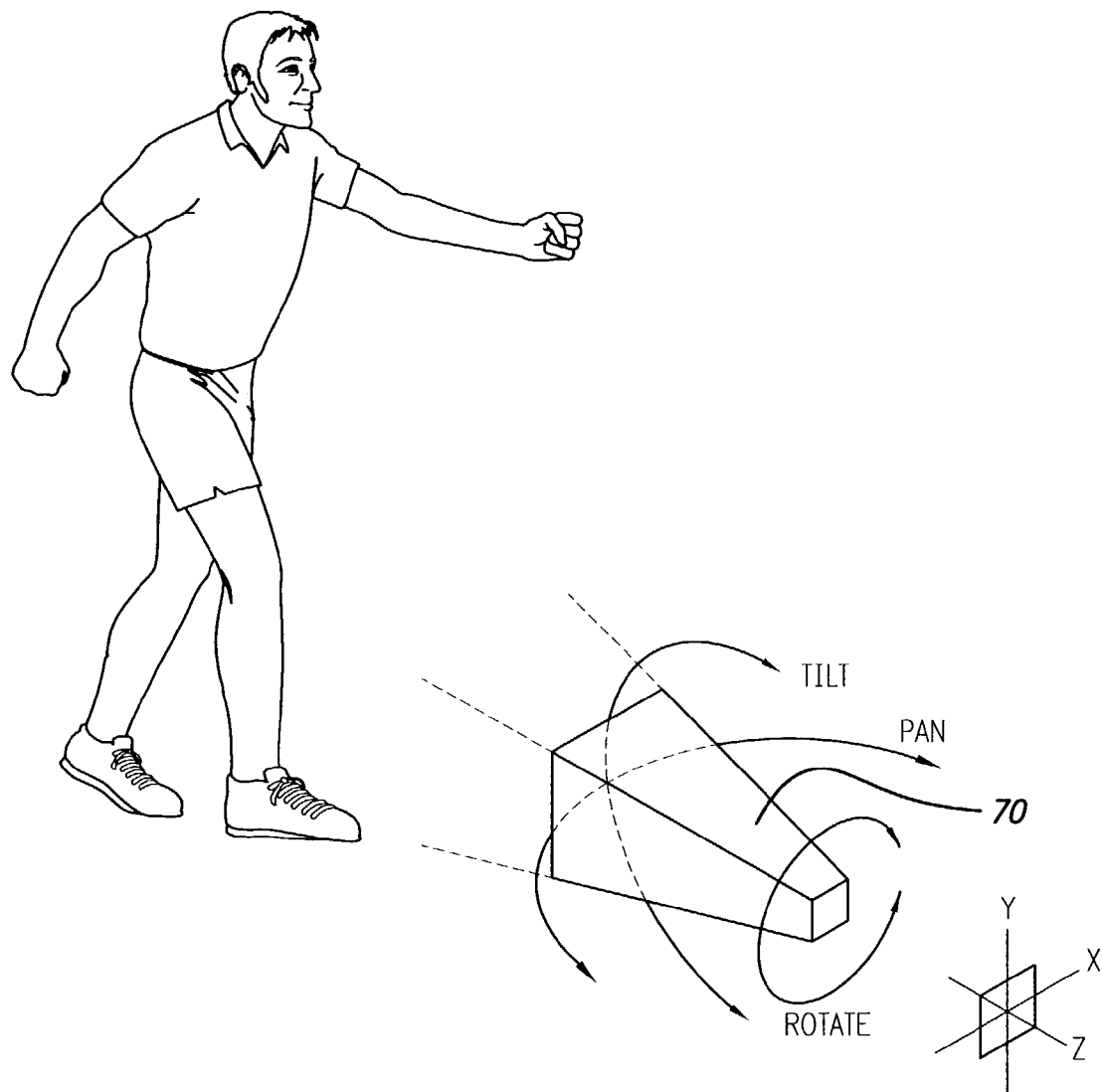
FIG. 4 is an exemplary graphical illustration of three-dimensional source data viewed by a virtual camera.

Referring briefly to FIG. 4, a graphical illustration is shown of a three-dimensional animated character as viewed by a user of the animation processor 12. The graphical illustration includes a virtual camera 70 having a field of view (illustrated in phantom) oriented with respect to the animated character. The virtual camera 70 is movable in three dimensions, including pan (i.e., about the y axis), tilt (i.e., about the x axis), and roll (i.e., about the z axis).

As generally known in the art, a motion capture system includes a motion capture processor (not shown) adapted to communicate with a plurality of cameras arranged with respect to a motion capture volume to capture the motion of one or more actors performing within the motion capture volume. Each actor's body is marked with markers that are detected by the cameras during the actor's performance within the motion capture volume. The markers may be reflective or illuminated elements. The motion capture processor processes two-dimensional images received from the cameras to produce a three-dimensional digital representation of the captured motion. Particularly, the motion capture processor receives the two-dimensional data from each camera and saves the data in the form of multiple data files as part of an image capture process. The two-dimensional data files are then resolved into a single set of three-dimensional coordinates that are linked together in the form of trajectory files representing movement of individual markers as part of an image processing process. The image processing process uses images from one or more cameras to determine the location of each marker. Kinetic calculations are then performed on the trajectory files to generate the digital representation reflecting motion corresponding to the actors' performance. Using the spatial information over time, the calculations determine the progress of each marker as it moves through space. The motion capture processor may utilize commercial software packages to perform these and other data processing functions, such as available from Vicon Motion Systems or Motion Analysis Corp.

Returning to FIG. 1, the animation system further includes an input device 20 adapted to communicate with the animation processor 12. As will be further described below, the input device 20 converts physical motion into signals provided to the animation processor 12 used to control the perspective of the virtual camera used to view the source data. The animation processor 12 includes a device driver 14, which is a program routine that links the input device 20 to the operating system of the animation processor. The device driver 14 contains the precise machine language necessary to translate the signals provided by the input device 20 to commands understood by the animation processor 12.

More particularly, the input device 20 includes a plurality of wheels 34, 44, 54 that can be physically turned about a corresponding shaft to move the virtual camera in a plurality of ways. The wheels 34, 44, 54 can each be turned about a respective axis to move the virtual camera in a designated range of motion. In a preferred embodiment of the invention, the first wheel 34 is adapted to pan the virtual camera, the second wheel 44 is adapted to tilt the virtual camera, and the third wheel 54 is adapted to roll the virtual camera. One or more of the wheels 34, 44, 54 could alternatively be adapted to move the virtual camera in other ways, such as to change the focus of the virtual camera (i.e., zoom in or out) or to move the camera laterally or vertically along an axis. It should be appreciated that a greater or lesser number of wheels could be utilized. As will be further described below, the wheels 34, 44, 54 would have a shape and tactile response analogous to the physical controls used to manipulate an actual camera so as to be familiar to professional cameramen.

Each of the wheels 34, 44, 45 has a corresponding encoder 32, 42, 52 coupled to the shaft of the respective wheel. Suitable angle encoders are well known in the art for converting the shaft rotation angle into electrical signals (incremental or absolute). The electrical signals may be used to derive information regarding the movement of the wheels, such as speed/direction of rotation and magnitude of movement. It is desirable to utilize an encoder having sufficiently high resolution so that relatively small movements of the wheels can be detected. An input control circuit 24 is electrically connected to the encoders 32, 42, 52. The input control circuit 24 converts the electrical signals into location coordinates and/or vector data suitable for communication to the animation processor 12 through a suitable interface 22. In an embodiment of the invention, the input control circuit 24 and/or interface 22 converts the electrical signals into a data stream having a format conventionally used by Kuper motion control systems that are used to capture and control a physical film camera. It should be understood that other data formats suitable for communication with conventional animation software packages could also be advantageously utilized. It should also be understood that the input control circuit 24 and interface 22 might be combined in a single circuit.

In an embodiment of the invention, the input device 20 further includes additional controls over operation of the wheels 34, 44, 54. A speed control 36, 46, 56 is associated with each respective one of the wheels 34, 44, 54. The speed control 36, 46, 56 may comprise a rotatable or slidable potentiometer, multi-position switch, angle encoder or other like device adapted to convert a user selective movement into a measurable electrical signal. The speed control 36, 46, 56 controls the resolution of the respective encoder 32, 42, 52 coupled to an associated wheel 34, 44, 54. For example, at a low speed setting-of the speed control 36, a full rotation of the wheel 34 may correspond to a small movement of the virtual camera, while at a high speed setting of the speed control 36, a full rotation of the wheel 34 may correspond to a large movement of the virtual camera. An operator would utilize a high speed setting if a character in a scene were moving quickly, such as running, and would utilize a low speed setting if the character was moving slowly. It should be appreciated that speed control 36, 46, 56 may be variable or may selectable in predefined increments. The input control circuit 24 uses the signals received from the speed control 36, 46, 56 to scale the electrical signals received from the encoders 32, 42, 52 prior to communication to the animation processor 12 through the interface 22.

Likewise, a direction control 38, 48, 58 is also associated with each respective one of the wheels 34, 44, 54. The direction control 38, 48, 58 may comprise a switch or other like device adapted to convert a user selective movement into a measurable electrical signal. The direction control 38, 48, 58 controls the direction of rotation of the respective encoder 32, 42, 52 coupled to an associated wheel 34, 44, 54. For example, at a first setting of the diction control 38, a clockwise rotation of the wheel 34 may correspond to a left pan movement of the virtual camera, while at a second setting of the direction control 38, a clockwise rotation of the wheel 34 may correspond to a right pan movement of the virtual camera. The input control device 24 uses the signals received from the direction control 38, 48, 58 to invert the electrical signals received from the encoders 32, 42, 52 prior to communication to the animation processor 12 through the interface 22.

It should also be appreciated that the speed and/or direction controls could also have corresponding keystrokes to control the animation processor instead of or in addition to the corresponding controls on the input device 20. This way, a software operator could command these changes to the control of the wheels 34, 44, 54 while another operator manipulates the wheels.

Figure 2:
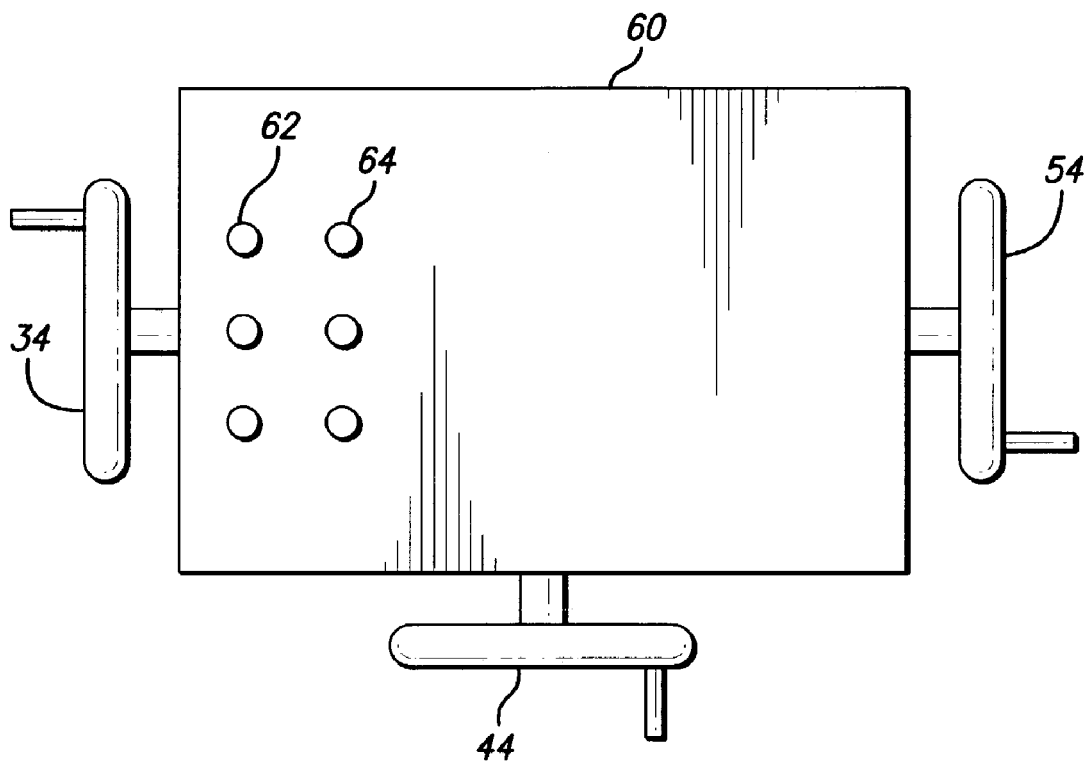
FIG. 2 is a top view of an exemplary input device.
Figure 3:
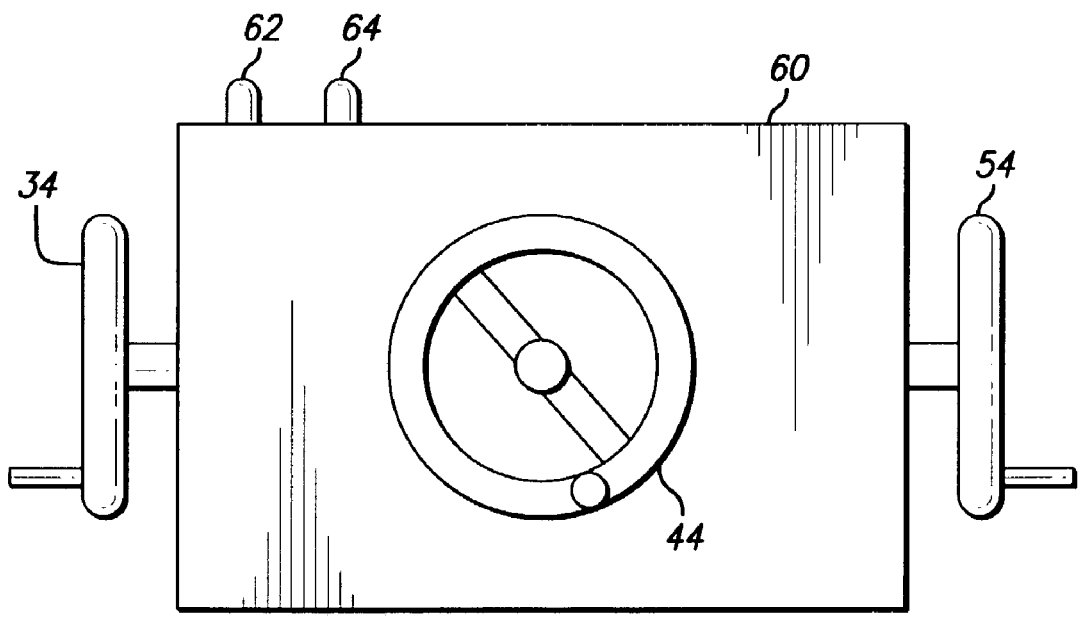
FIG. 3 is a side view of the input device of FIG. 2.

FIGS. 2 and 3 illustrate an exemplary input device constructed in accordance with an embodiment of the invention. The input device is illustrated as a generally rectangular housing 60 having a plurality of external surfaces. Wheels 34, 44, 54 are coupled to respective left side, front, and right side surfaces of the housing 60. Each of the wheels 34, 44, 54 are configured as having a round gripping surface, a pin (or panhandle) extending perpendicularly from the gripping surface, and a central shaft coupled to the gripping surface using spokes. The interface 22 and input control circuit 24 described above with respect to FIG. 1 would be contained within the housing.

It should be appreciated that an operator can turn each wheel by grasping the gripping surface with one or two hands or could instead turn the wheel by moving the pin. Other configurations of the wheels 34, 44, 54 could also be utilized. The top surface of the housing 60 is illustrated as including an array of knobs 62, 64 comprising the speed and/or directional controls for the wheels 34, 44, 54. The arrangement of the wheels 34, 44, 54 and knobs 62, 64 on the surfaces of the housing 60 are not pertinent to the operation of the present invention, and it should be understood that a wide assortment of different arrangements, including different numbers of wheels and knobs, could be advantageously utilized. In the preferred embodiment, the input device would communicate with the animation processor through a cable as generally understood in the art, but it should also be appreciated that a wireless connection (e.g., infrared or radio frequency (RF)) could also be utilized.

Having thus described a preferred embodiment of a wheel motion control input device for an animation system, it should be apparent to those skilled in the art that certain advantages of the invention have been achieved. It should also be appreciated that various modifications, adaptations, and alternative embodiments thereof may be made within the scope and spirit of the present invention. The invention is further defined by the following claims.

What is claimed is:

1. A computer graphics animation system, comprising:
   an animation processor adapted to execute software program enabling the creation of 3D graphical images, said software program including a virtual camera that is controllable to determine orientation of viewing of said 3D graphical images; and
   an input device operatively coupled to said animation processor for controlling a range of motion of said virtual camera, said input device comprising a housing, at least one wheel operatively coupled to at least one outer surface of said housing, said at least one wheel having an axially coupled shaft that is driven rotation ally by manipulation of said wheel, and means contained within said housing and operatively coupled to said shaft for generating a control signal corresponding to rotational motion of said at least one wheel, said control signal thereby being provided to said animation processor to control said virtual camera.

2. The animation system of claim 1, wherein said generating means further comprises an angle encoder operatively coupled to said shaft.

3. The animation system of claim 1, wherein said generating means further comprises a control circuit adapted to convert said control signal into a data stream having a format readable by said animation processor.

4. The animation system of claim 1, further comprising at least one speed control associated with said at least one wheel and adapted to change effective resolution of said at least one wheel.

5. The animation system of claim 1, further comprising at least one direction control associated with said at least one wheel and adapted to change effective direction of said at least one wheel.

6. A computer graphics animation system, comprising:
an animation processor adapted to execute software program enabling the creation of 3D graphical images, said software program including a virtual camera that is controllable to determine orientation of viewing of said 3D graphical images; and
an input device operatively coupled to said animation processor for controlling a range of motion of said virtual camera, said input device comprising a housing, at least one wheel operatively coupled to at least one outer surface of said housing, said at least one wheel having an axially coupled shaft that is driven rotationally by manipulation of said wheel, and means contained within said housing and operatively coupled to said shaft for generating a control signal corresponding to rotational motion of said at least one wheel, said control signal thereby being provided to said animation processor to control said virtual camera;
wherein said at least one wheel further comprises a plurality of wheels with each such wheel corresponding to a different range of motion of said virtual camera.

7. The animation system of claim 6, wherein said plurality of wheels further comprises a first wheel corresponding to panning motion of said virtual camera.

8. The animation system of claim 6, wherein said plurality of wheels further comprises a second wheel corresponding to tilting motion of said virtual camera.

9. The animation system of claim 6, wherein said plurality of wheels further comprises a third wheel corresponding to rolling motion of said virtual camera.

10. An input device for an animation system, comprising:
a housing;
at least one wheel operatively coupled to at least one outer surface of said housing, said at least one wheel having an axially coupled shaft that is driven rotationally by manipulation of said wheel;
means contained within said housing and operatively coupled to said shaft for generating a control signal corresponding to rotational motion of said at least one wheel, said control signal thereby being provided to an animation system to control a range of motion of a virtual camera utilized within said animation system.

11. The input device of claim 10, wherein said generating means further comprises an angle encoder operatively coupled to said shaft.

12. The input device of claim 10, wherein said generating means further comprises a control circuit adapted to convert said control signal into a data stream having a format readable by said animation system.

13. The input device of claim 10, further comprising at least one speed control associated with said at least one wheel and adapted to change effective resolution of said at least one wheel.

14. The input device of claim 10, further comprising at least one direction control associated with said at least one wheel and adapted to change effective direction of said at least one wheel.

15. An input device for an animation system, comprising:
a housing;
at least one wheel operatively coupled to at least one outer surface of said housing, said at least one wheel having an axially coupled shaft that is driven rotationally by manipulation of said wheel;
means contained within said housing and operatively coupled to said shaft for generating a control signal corresponding to rotational motion of said at least one wheel, said control signal thereby being provided to an animation system to control a range of motion of a virtual camera utilized within said animation system;
wherein said at least one wheel further comprises a plurality of wheels with each such wheel corresponding to a different range of motion of said virtual camera.

16. The input device of claim 15, wherein said plurality of wheels further comprises a first wheel corresponding to panning motion of said virtual camera.

17. The input device of claim 15, wherein said plurality of wheels further comprises a second wheel corresponding to tilting motion of said virtual camera.

18. The input device of claim 15, wherein said plurality of wheels further comprises a third wheel corresponding to rolling motion of said virtual camera.

* * * * *